June 1, 1965 H. W. BROWN, SR 3,186,012

FLUID MOTOR DRIVE MECHANISM AND CONTROL THEREFOR

Filed Dec. 17, 1962 2 Sheets-Sheet 1

INVENTOR.
HARRY W. BROWN, SR.
BY Woodling, Krost, Granger and Rust
ATTORNEYS

FLUID MOTOR DRIVE MECHANISM AND CONTROL THEREFOR

INVENTOR.
HARRY W. BROWN, SR.
BY Woodling, Krost, Granger and Rust
ATTORNEYS 3,186,012

FLUID MOTOR DRIVE MECHANISM AND CONTROL THEREFOR

Harry W. Brown, Sr., Willowick, Ohio, assignor to The National Acme Company, a corporation of Ohio
Filed Dec. 17, 1962, Ser. No. 245,007
13 Claims. (Cl. 10—139)

This application is a continuation-in-part of application Serial No. 137,624, filed September 12, 1961 and entitled Feed Mechanism.

The invention relates in general to drive mechanisms and more particularly to a servomotor controlled by a master thread.

The invention may be incorporated in a servomotor mechanism wherein control means is provided having first and second relatively movable members and with the control means controlling movement of the servomotor. A movable element is connected to relatively move the first and second relatively movable members. A worm wheel is journaled on the movable element and has teeth in threaded engagement with a master thread. Brake means is disposed to act on the worm wheel and when the brake is released the worm wheel rotates freely as the master thread rotates. Means is provided to engage the brake means to lock the worm wheel against rotation and accordingly rotation of the master thread causes the movable element to be moved to actuate the control means to establish movement of the servomotor.

An object of the invention is to provide a drive means as controlled by a master thread causing rotation of a worm wheel when the worm wheel is permitted to rotate and causing translation of the worm wheel when the worm wheel is braked, the translation of the worm wheel being used as a control function.

Another object of the invention is to provide a drive mechanism in a servomotor system wherein a worm wheel may be either rotated or translated by a master thread.

Another object of the present invention is to provide a servomotor controlled means as actuated by a thread driven worm wheel which may be selectively braked to establish and discontinue the control function.

Another object of the invention is to provide a servomotor controlled mechanism wherein brake means is actuable to control a thread driven worm wheel and actuation of the brake commences the control function and release of the brake permits a rapid traverse control function in the opposite direction.

Other objects and a fuller understanding of this invention may be had by referring to the following description and claims, taken in conjunction with the accompanying drawing, in which:

Figure 1:
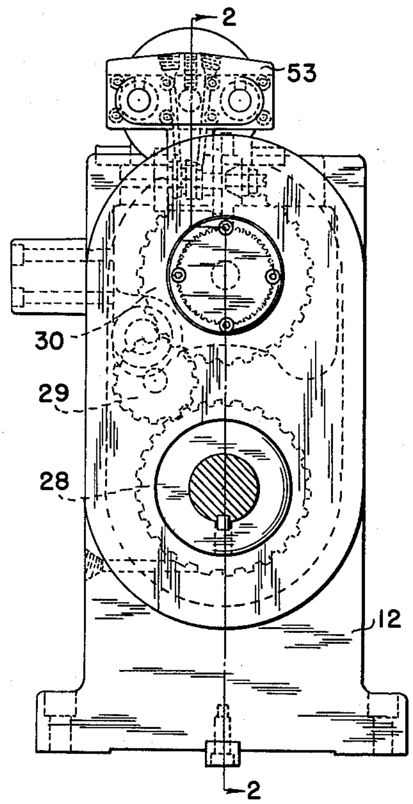
FIGURE 1 is a front view of a servomotor drive mechanism incorporating the invention.

The drawing shows a drive mechanism 11 which is illustrative of a machine incorporating the invention. This drive mechanism 11 has a base 12 carrying a cylinder 13. A differential piston 14 is slidable within the cylinder 13 along an axis 15. The differential piston 14 establishes first and second chambers 16 and 17 with the cylinder 13, with the first chamber 16 being a large area chamber and the second chamber 17 being a small area chamber.

A rotatable spindle 20 is journaled within the piston 14 and movable axially therewith. The spindle 20 is driven from some external motor 21 through a drive pulley 22 and a sleeve 23. This sleeve 23 has an elongated slot 24 to be engaged by a drive pin 25 on the spindle 20 to permit the axial movement of spindle 20.

A gear 28 is fixed on the spindle 20 and drives through an idler gear 29 to another gear 30 fixed on a spindle center 31. This spindle center 31 together with a tail center 32 journals a master thread 33 for rotation on an axis 34 parallel to the main axis 15. A drive pin 35 assures rotation of the master thread 33 with the spindle center 31. A front plate 38 is fixed to the front of the piston 14 and a rear plate 39 is fixed to the rear of the piston 14. The front plate 38 journals the spindle center 31 and the rear plate 39 journals the tail center 32. Accordingly, axial movements of the differential piston 14 are imparted to the master thread 33. The spindle 20 is thus rotatable from the motor 21 and movable axially by the differential piston 14. Accordingly, it may be used in many applications and one application is in threading a workpiece. A thread forming tool 36 for example, may be carried on the spindle 20 to perform threading operations on a workpiece 37.

Control means is provided for the differential piston 14 which is a servomotor, and this control means is shown in the form of a control valve 40. The valve 40 has a housing 41 which may be adjustably fixed on the base 12. A valve spool 42 is carried within the valve housing 41 for reciprocal control movements along an axis 43. The control valve 40 has a pressure fluid inlet 44, a control outlet 45 and a tank return 46. The pressure fluid inlet 44 is connected to a pressure fluid port 47 which is controlled in communication with a control port 48 by a land 49 on the valve spool 42. A spring 50 urges the valve spool 42 to the right, as viewed in FIGURE 2, and in this position the land 49 opens communication between the control port 48 and the tank return 46.

A movable element or slide 53 is provided to move axially along the axis 43. This slide 53 is carried on slide rods 54 fixedly carried in the valve housing 41. A center actuating rod 55 is fixed in the slide 53 and bears against the right end of the valve spool 42. A yoke 56 interconnects the outboard ends of the slide rods 54 but is not connected to the center actuating rod 55. Thus the slide 53 has limited sliding movement between the right end of the valve housing 41 and the yoke 56.

The slide 53 journals a worm wheel 59 which has peripheral teeth thereof in threaded engagement with the master thread 33. This worm wheel 59 is journaled on a shaft 60 which is fixed to a piston 61 carried within a cylinder 62. This cylinder 62 is fixed on the slide 53. The axis 63 of the piston 61 is in a plane perpendicular to the axis 34 of the master thread 33. The shaft 60 carries a first conical surface 64 which is complementary to a second conical surface 65 carried on the worm wheel 59. A friction brake disc 66 is fixed on the face of the cylinder 62 to act on the worm wheel 59. A fluid pressure source 69 may be connected through a valve 70 to a first chamber 71 at the left end of the piston 61 or may alternatively be connected through the valve 70 and to the other chamber 72 at the right end of the piston 61. Movement of the valve 70 permits fluid pressure actuation of the piston 61 in either direction. The fluid pressure source 69 may also be connected to the pressure fluid inlet 44 and to the small area chamber 17 of the differential piston and cylinder. The control outlet 45 is connected by a conduit 51 to the large area chamber 16 of the differential piston and cylinder.

*Operation*

The drive mechanism 11 may be used as a control servomotor for example to rotate and axially move the threading tool 36 to thread a stationary workpice 37. This servomotor movement is controlled in accordance with rotation of the master thread 33. The motor 21 provides the rotational driving force for the spindle 20 and through the gears 28–30 also rotates the master thread 33 at the same rate of speed. Because of the idler gear 29, the master thread 33 rotates in the same direction as the spindle 20. Accordingly, if a right hand thread is to be cut on the workpiece, 37, a master 33 of right hand thread is used.

Figure 3:
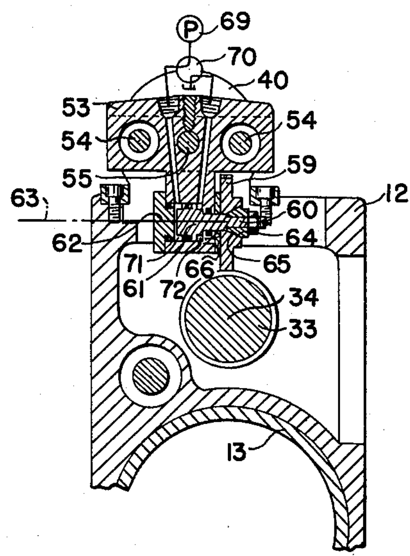
FIGURE 3 is a sectional view on line 3—3 of FIGURE 2.

The valve 70, FIGURE 3, is shown in a position supplying pressure fluid to the chamber 71 and this moves the shaft 60 axially to the right relatively separating the conical surfaces 64 and 65 and releasing the brake means by releasing axial force between the worm wheel 59 and the brake disc 66. The differential piston 14 is shown retracted to the rear, which is to the left as viewed in FIGURE 2. To start the feed movement to the right which will result in threading the workpiece 37, the brake means is actuated. This is effected by moving the valve 70 to direct pressure fluid to the chamber 72. This moves piston 61 to the left as viewed in FIGURE 3 to engage the brake means. Previously the worm wheel 59 was capable of free rotation on the shaft 60 and hence rotation of the spindle 20 and master thread 33 had no effect on the control valve 40. Now with the brake means engaged, the worm wheel 59 can no longer rotate. Accordingly, each complete revolution of the master thread 33 translates the worm wheel 59 to the left, as viewed in FIGURE 2, by the pitch between successive threads. This translation of the worm wheel 59 means that the slide 53 is also translated to the left to actuate the valve spool 42 to the left. This opens communication from the pressure port 47 to the control port 48 and thus pressure fluid is admitted to the large area chamber 16. When the force in this chamber overcomes the force in the small area chamber 17 from the constant pressure source 69, the differential piston 14 moves to the right. This movement carries with it the master thread 33 because of the front and rear plates 38 and 39 and accordingly, this is a follow-up movement for the servomotor. This translates the worm wheel 59 to the right to a position wherein just sufficient fluid flow is passed by the land 49 from the pressure port 47 to the control port 48 to maintain a balanced condition. This balanced condition establishes just sufficient fluid flow into the large area chamber 16 to move the differential piston 14 at a controlled rate directly in accordance with rotation of the master thread 33.

Figure 2:
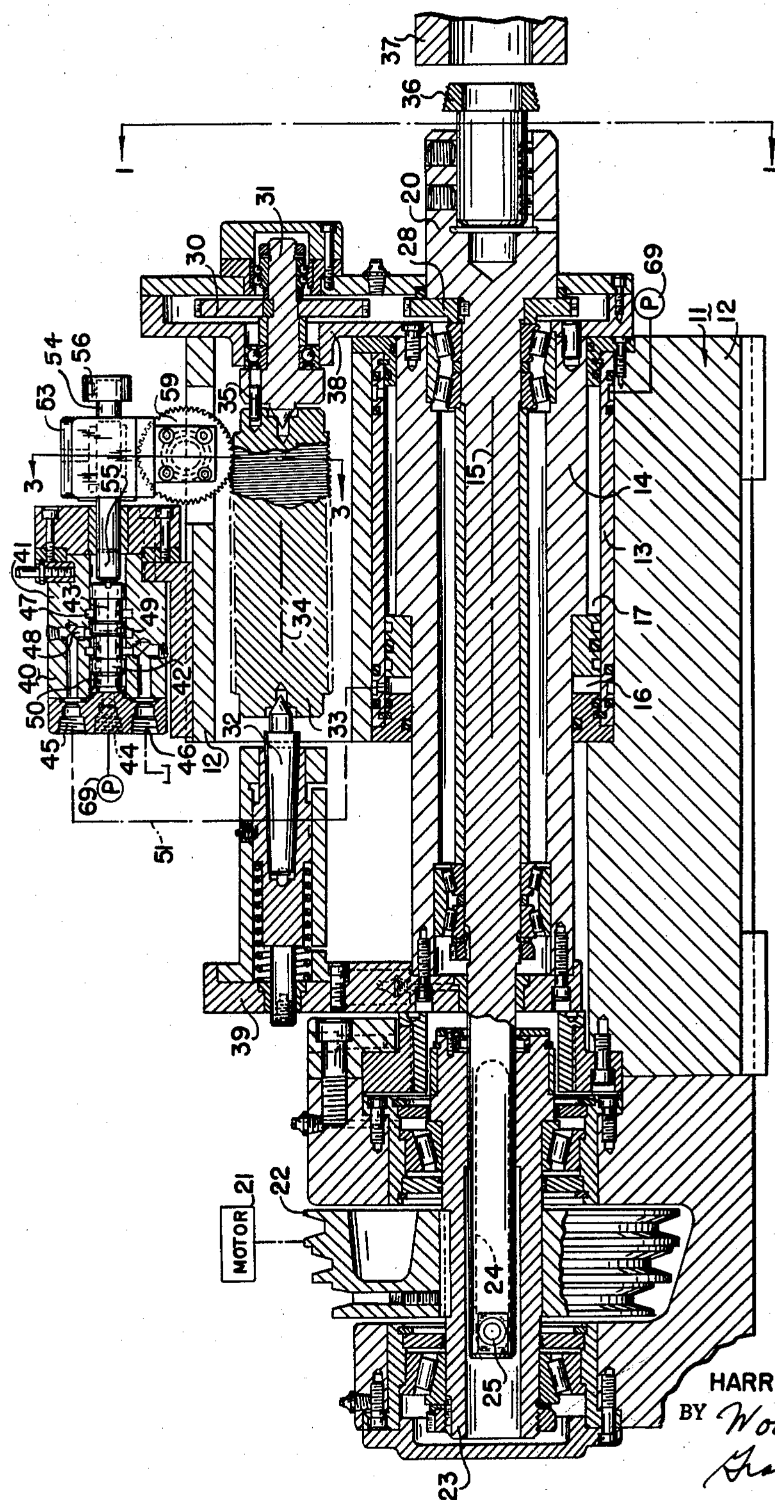
FIGURE 2 is a longitudinal section view on line 2—2 of FIGURE 1.

The feed rate movement to the right of the spindle 20 may be terminated at any time by releasing the brake means. This may be done automatically by tripping a dog to control the valve 70 or by manual actuation of the valve 70. When this valve 70 is restored to the position shown in FIGURE 3, the brake means is released and worm wheel 59 again may rotate by rotation of the master 33. The compression spring 50 pushes the valve spool 42 to the right as viewed in FIGURE 2 and accordingly, land 49 opens communication from the control port 48 to the tank return 46. This relieves fluid pressure in the large area chamber 16 and thus the constant fluid pressure from source 69 into the small area chamber 17 moves the piston 14 in rapid traverse movement to the left to return to the starting point as shown in FIGURE 2.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A drive mechanism, comprising in combination,
a servomotor,
a master thread journaled for rotation,
a movable element movable in translation,
a worm wheel journaled on said movable element and with the teeth thereof in threaded engagement with said master thread,
brake means disposed to act on said worm wheel,
means to rotate said master thread,
means to release said brake means to permit said worm wheel to rotate freely as said master thread is rotated,
means to engage said brake means to lock said worm wheel against rotation and accordingly rotation of said master thread causes translation of said worm wheel and of said movable element,
and control means connected to control said servomotor in response to translation of said movable element.

2. A drive mechanism, comprising in combination,
a servomotor,
control means having first and second relatively movable members and connected to control movement of said servomotor,
a movable element connected to relatively move said first and second relatively movable members of said control means,
a master thread journaled for rotation,
a worm wheel journaled on said movable element and with the teeth thereof in threaded engagement with said master thread,
brake means disposed to act on said worm wheel,
means to rotate said master thread,
means to release said brake means to permit said worm wheel to rotate freely as said master thread is rotated,
means to engage said brake means to lock said worm wheel against rotation and accordingly rotation of said master thread causes said movable element to be moved to actuate said control means to establish movement of said servomotor.

3. A drive mechanism, comprising in combination,
a motor,
control means having first and second relatively movable members,
means connecting said control means to said motor to control the rate of movement thereof,
a movable element connected to relatively move said first and second relatively movable members of said control means,
a master thread journaled for rotation,
a worm wheel journaled on said movable element and with the teeth thereof in threaded engagement with said master thread,
brake means disposed to act on said worm wheel,
means to rotate said master thread at a predetermined rate,
means to release said brake means to permit said worm wheel to rotate freely as said master thread is rotated,
means to engage said brake means to lock said worm wheel against rotation and accordingly rotation of said master thread causes said movable element to be moved to actuate said control means to establish movement of said motor,
and means to relatively move said first and second relatively movable members to said control means in accordance with movement of said motor for a follow-up servomotor movement.

4. A drive mechanism, comprising in combination,
a fluid motor,
control means having a housing and a movable member,
means connecting said control means to said fluid motor to control the rate of movement thereof,
a movable element connected to relatively move said control means movable member and housing,
a master thread journaled for rotation,
a worm wheel journaled on said movable element and with the teeth thereof in threaded engagement with said master thread,
brake means disposed to act on said worm wheel,
means to rotate said master thread at a predetermined rate,
means to release said brake means to permit said worm wheel to rotate freely as said master thread is rotated,
means to engage said brake means to lock said worm wheel against rotation and accordingly rotation of said master thread causes said movable element to be moved to actuate said control means to establish movement of said fluid motor, and means to move said master thread axially in accordance with movement of said fluid motor for a follow-up servomotor movement.

5. A drive mechanism, comprising in combination, a fluid motor, a control valve having a housing and a valve member, means connecting said valve to said fluid motor to control the rate of movement thereof, a movable member connected to relatively move said valve member and housing, a master thread journaled for rotation, a worm wheel journaled on said movable member and with the teeth thereof in threaded engagement with said master thread, brake means disposed to act on said worm wheel, fluid pressure means connected to actuate said brake means, means to rotate said master thread at a predetermined rate, means to actuate said fluid pressure means in one direction to release said brake means to permit said worm wheel to rotate freely as said master thread is rotated, means to actuate said fluid pressure means in the opposite direction to actuate said brake means to lock said worm wheel against rotation and accordingly rotation of said master thread causes said movable member to be moved to actuate said control valve to establish movement of said fluid motor, and means to relatively move said control valve member and housing in accordance with movement of said fluid motor for a follow-up servomotor movement.

6. A drive mechanism, comprising in combination, a fluid motor, a master thread journaled for rotation, a control valve having a housing and a valve member, means connecting said valve to said fluid motor to control the rate of movement thereof, a movable member connected to relatively move said valve member and housing, a worm wheel journaled on said movable member and with the teeth thereof in threaded engagement with said master thread, brake means disposed to act on said worm wheel, a piston and cylinder connected to actuate said brake means, means to rotate said master thread at a predetermined rate, fluid pressure means to relatively actuate said piston and cylinder to release said brake means to permit said worm wheel to rotate freely as said master thread is rotated, means to relatively actuate said piston and cylinder in the opposite direction to actuate said brake means to lock said worm wheel against rotation and accordingly rotation of said master thread causes said movable member to be moved to actuate said control valve to establish movement of said fluid motor, and means to move said master thread axially in accordance with movement of said fluid motor for a follow-up servomotor movement.

7. A drive mechanism, comprising in combination, a fluid motor, a master thread connected to be moved axially in accordance with movement of said fluid motor, a control valve having a housing and a valve member, means connecting said valve to said fluid motor to control the rate of movement thereof, a movable member connected to relatively move said valve member and housing, a worm wheel journaled on said movable member and with the teeth thereof in threaded engagement with said master thread, a brake disc disposed to act on said worm wheel, a piston and cylinder connected to relatively actuate said worm wheel and brake disc, means to rotate said master thread at a predetermined rate, means to supply pressure fluid to one chamber of said cylinder to relatively release said worm wheel and brake disc to permit said worm wheel to rotate freely as said master thread is rotated, valve means to control the flow of pressure fluid alternatively to the other chamber of said cylinder to urge said piston in a second axial direction to cause said worm wheel and brake disc to engage to lock said worm wheel against rotation, whereby rotation of said master thread with said worm wheel braked causes said movable member to be moved to actuate said control valve to establish movement of said fluid motor, and movement of said fluid motor also moving said master thread axially for a follow-up servomotor movement.

8. A feed mechanism, comprising in combination, a base, a fluid motor having a movable member, a master thread movable axially in accordance with movement of said movable member, a control valve having a housing and a valve member, means connecting said valve to said fluid motor to control the rate of movement thereof, a second movable member connected to relatively move said valve member and housing, a worm wheel journaled on said second movable member and with the teeth thereof in threaded engagement with said master thread, a piston and cylinder, a first conical surface moved by said piston, a second conical surface on said worm wheel complementary to said first conical surface, a brake disc disposed to act on said worm wheel, means to rotate said master thread at a predetermined rate, means to supply pressure fluid to one chamber of said cylinder to move said piston in a first axial direction to separate said conical surfaces and relatively release said worm wheel and brake disc to permit said worm wheel to rotate freely as said master thread is rotated, valve means to control the flow of pressure fluid alternatively to the other chamber of said cylinder to urge said piston in a second axial direction to cause said conical surfaces to engage and cause said worm wheel and brake disc to engage to lock said worm wheel against rotation, whereby rotation of said master thread with said worm wheel braked causes said second movable member to be moved to actuate said control valve to establish feed movement of said fluid motor movable member, and movement of said fluid motor movable member also moving said master thread axially for a follow-up servomotor movement.

9. A feed mechanism, comprising in combination, a base, a fluid motor having a movable member, a master thread movable axially in accordance with movement of said movable member, a control valve having a housing and a valve member, means connecting said valve to said fluid motor to control the rate of movement thereof, a slide slidable parallel to the axis of said valve member and acting to relatively move said valve member and housing, a worm wheel journaled on said slide and with the teeth thereof in threaded engagement with said master thread, a piston and cylinder on said slide, a first conical surface moved by said piston, a second conical surface on said worm wheel complementary to said first conical surface, a brake disc disposed to act on said worm wheel, means to rotate said master thread at a predetermined rate, means to supply pressure fluid to one chamber of said cylinder to move said piston in a first axial direction to separate said conical surfaces and relatively release said worm wheel and brake disc to permit said worm wheel to rotate freely as said master thread is rotated, valve means to control the flow of pressure fluid alternatively to the other chamber of said cylinder to urge said piston in a second axial direction to cause said conical surfaces to engage and cause said worm wheel and brake disc to engage to lock said worm wheel against rotation, said cylinder being carried on said slide whereby rotation of said master thread with said worm wheel braked causes said slide to be moved to actuate said control valve to establish feed movement of said fluid motor movable member, and movement of said fluid motor movable member also moving said master thread therewith for a follow-up servomotor movement.

10. A feed mechanism, comprising in combination, a base, a first piston and cylinder on said base having first and second chambers, a master thread movable axially in accordance with relative axial movement of said piston and cylinder, means to rotate said master thread at a predetermined rate, a control valve having a housing carried on said base, a valve spool in said valve and having an axis parallel to said master thread, a pressure fluid inlet and a control outlet in said control valve, conduit means connecting said control outlet of said valve to said first chamber of said first cylinder, means supplying pressure fluid to said pressure fluid inlet of said valve and to said second chamber of said cylinder, a slide slidable parallel to the axis of said valve spool and acting to relatively move said valve spool and housing, a worm wheel journaled on said slide and with the teeth thereof in threaded engagement with said master thread, a second piston and cylinder on said slide, a first conical surface moved by said second piston, a second conical surface on said worm wheel complementary to said first conical surface, a brake disc disposed between said worm wheel and said second cylinder, means to supply pressure fluid to one chamber of said second cylinder to move said second piston in a first axial direction to separate said conical surfaces and separate said worm wheel and brake disc to permit said worm wheel to rotate freely as said master thread is rotated, valve means to control the flow of pressure fluid alternatively to the other chamber of said second cylinder to urge said second piston in a second axial direction to cause said conical surfaces to engage and move said worm wheel axially to frictionally engage said brake disc to lock said worm wheel against rotation relative to said second cylinder, said second cylinder being carried on said slide whereby rotation of said master thread with said worm wheel braked causes said slide to be moved to open communication from said pressure fluid inlet to said control outlet to increase the pressure in said first cylinder first chamber to a degree overcoming the force on said first piston from said second chamber to establish feed movement of said first piston in the opposite axial direction, and movement of said first piston in said opposite axial direction also moving said master thread therewith for a follow-up servomotor movement.

11. A feed mechanism, comprising in combination, a base, a first piston and cylinder on said base having first and second chambers, a master thread movable axially in accordance with relative axial movement of said piston and cylinder, means to rotate said master thread at a predetermined rate, a control valve mounted on said base, a valve spool in said valve and having an axis parallel to said master thread, a pressure fluid inlet and a control outlet in said control valve, conduit means connecting said control outlet of said valve to said first chamber of said first cylinder, means supplying pressure fluid to said pressure fluid inlet of said valve and to said second chamber of said cylinder, a slide slidable on the axis of said valve spool and acting on one end of said valve spool, a worm wheel journaled on said slide with the axis thereof disposed in a plane perpendicular to said axis of said master thread and having the teeth thereof in threaded engagement with said master thread, a second piston and cylinder on said slide, a first conical surface moved by said second piston, a second conical surface on said worm wheel complementary to said first conical surface, a brake disc disposed between said worm wheel and said second cylinder, means to supply pressure fluid to one chamber of said second cylinder to move said second piston in a first axial direction to separate said conical surfaces and separate said worm wheel and brake disc to permit said worm wheel to rotate freely, valve means to control the flow of pressure fluid alternatively to the other chamber of said second cylinder to urge said second piston in a second axial direction to cause said conical surfaces to engage and move said worm wheel axially to frictionally engage said brake disc to lock said worm wheel against rotation relative to said second cylinder, said second cylinder being carried on said slide whereby rotation of said master thread with said worm wheel braked causes said slide to be moved axially of said first valve spool in a first direction to open communication from said pressure fluid inlet to said control outlet to increase the pressure in said first cylinder first chamber to a degree overcoming the force on said first piston from said second chamber to establish feed movement of said first piston in the opposite axial direction, and movement of said first piston in said opposite axial direction also moving said master thread therewith for a follow-up servomotor movement.

12. A threading machine, comprising in combination, a base, a differential piston and cylinder on said base having large and small area chambers, a rotatable spindle journaled on said base and movable axially with said piston, a master thread movable axially in accordance with axial movement of said differential piston, means to rotate said master thread and said spindle at the same rate, a control valve mounted on said base, a valve spool in said valve and having an axis parallel to said master thread, a pressure fluid inlet and a control outlet in said control valve, said control valve having a control port connected to said control outlet and controlled by a land on said valve spool, conduit means connecting said control outlet of said valve to said large area chamber of said differential cylinder, means supplying pressure fluid to said pressure fluid inlet of said valve and to said small area chamber of said cylinder, a slide slidable on the axis of said valve spool and acting on one end of said valve spool, a shaft carried on said slide disposed in a plane perpendicular to said axis of said master thread, a first conical surface on said shaft, a worm wheel journaled on said shaft and with the teeth thereof in threaded engagement with said master thread, a second conical surface on said worm wheel complementary to said first conical surface, a second piston and cylinder acting on said shaft, a brake disc surrounding said shaft and disposed between said worm wheel and said second cylinder, means to supply pressure fluid to one chamber of said second cylinder to move said shaft in a first axial direction to separate said conical surfaces and separate said worm wheel and brake disc to permit said worm wheel to turn freely on said shaft, valve means to control the flow of pressure fluid alternatively to the other chamber of said second cylinder to urge said shaft in a second axial direction to cause said conical surfaces to engage and move said worm wheel axially to frictionally engage said brake disc to lock said worm wheel against rotation relative to said second cylinder, said second cylinder being carried on said slide whereby rotation of said master thread with said worm wheel braked causes said slide to be moved axially of said first valve spool in a first direction to open communication from said pressure fluid inlet to said control port to increase the pressure in said first cylinder large area chamber to a degree overcoming the force on said differential piston small area to establish feed movement of said first differential piston in the opposite axial direction, and movement of said differential piston in said opposite axial direction also moving said master thread therewith for a follow-up servomotor movement.

13. A threading machine, comprising in combination, a base, a differential piston and cylinder on said base having large and small area chambers, a master thread journaled on an axis parallel to the axis of said piston and movable axially in accordance with axial movement of said differential piston, means to rotate a threading tool and said master thread at the same rate, means to axially move said threading tool in accordance with axial movement of said piston, a three-way control valve mounted on said base, a valve spool in said valve and having an axis parallel to said master thread, a pressure fluid inlet, an exhaust and a control outlet in said three-way valve, said control valve having a control port connected to said control outlet and controlled by a land on said valve spool, conduit means connecting said control outlet of said valve to said large area chamber of said differential cylinder, means supplying pressure fluid to said pressure fluid inlet of said valve and to said small area chamber of said cylinder, a slide slidable on the axis of said valve spool and acting on one end of said valve spool, a compression spring acting on the other end of said valve spool, a shaft carried on said slide disposed in a plane perpendicular to said axis of said master thread, a first conical surface on said shaft, a worm wheel journaled on said shaft and with the teeth thereof in threaded engagement with said master thread, a second conical surface on said worm wheel complementary to said first conical surface, a second piston and cylinder on said shaft, a brake disc surrounding said shaft and disposed between said worm wheel and said second cylinder, means to connect said pressure fluid source to one chamber of said second cylinder to move said shaft in a first axial direction to separate said conical surfaces and separate said worm wheel and brake disc to permit said worm wheel to turn freely on said shaft, valve means to control the flow of pressure fluid alternatively to the other chamber of said second cylinder to urge said shaft in a second axial direction to cause said conical surfaces to engage and move said worm wheel axially to frictionally engage said brake disc to lock said worm wheel against rotation relative to said second cylinder, said second cylinder being carried on said slide whereby rotation of said master thread with said worm wheel locked causes said worm wheel to be moved and said slide to be moved axially of said first valve spool in a first direction to open communication from said pressure fluid inlet to said control port to increase the pressure in said first cylinder large area chamber to a degree overcoming the force on said differential piston small area to establish feed movement of said first differential piston in the opposite axial direction, and movement of said differential piston in said opposite axial direction also moving said master thread therewith for a follow-up servomotor movement.

References Cited by the Examiner

UNITED STATES PATENTS

| | | | |
|---|---|---|---|
| 2,601,157 | 6/52 | Lelan | 10—105 |
| 2,994,305 | 8/61 | Bruet | 91—380 |

ANDREW R. JUHASZ, *Primary Examiner*.